US007797441B1

(12) United States Patent
Barnes et al.

(10) Patent No.: US 7,797,441 B1
(45) Date of Patent: Sep. 14, 2010

(54) METHODS AND SYSTEMS FOR STREAMING ADVERTISING CONTENT

(75) Inventors: James D. Barnes, Overland Park, KS (US); Sanjay K. Sharma, Olathe, KS (US); Peter H Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 770 days.

(21) Appl. No.: 11/436,683

(22) Filed: May 18, 2006

(51) Int. Cl.
*G06F 15/16* (2006.01)
(52) U.S. Cl. .................. 709/231; 709/217; 709/219; 709/227
(58) Field of Classification Search .............. 709/217, 709/219, 227, 231; 705/14
See application file for complete search history.

(56) References Cited

U.S. PATENT DOCUMENTS

| | | | | | |
|---|---|---|---|---|---|
| 5,848,396 | A | * | 12/1998 | Gerace | 705/10 |
| 5,991,735 | A | * | 11/1999 | Gerace | 705/10 |
| 7,010,293 | B2 | * | 3/2006 | Go | 455/414.3 |
| 7,412,533 | B1 | * | 8/2008 | Johnson et al. | 709/231 |
| 7,610,597 | B1 | * | 10/2009 | Johnson et al. | 725/32 |
| 2001/0014876 | A1 | * | 8/2001 | Miyashita | 705/37 |
| 2002/0032771 | A1 | * | 3/2002 | Gledje | 709/224 |
| 2002/0099452 | A1 | * | 7/2002 | Kawai | 700/16 |
| 2002/0128908 | A1 | * | 9/2002 | Levin et al. | 705/14 |
| 2003/0014310 | A1 | * | 1/2003 | Jung et al. | 705/14 |
| 2003/0052913 | A1 | * | 3/2003 | Barile | 345/745 |
| 2005/0125354 | A1 | * | 6/2005 | Pisaris-Henderson et al. | 705/52 |
| 2005/0210120 | A1 | * | 9/2005 | Yukie et al. | 709/217 |
| 2006/0026067 | A1 | * | 2/2006 | Nicholas et al. | 705/14 |
| 2007/0100787 | A1 | * | 5/2007 | Lim et al. | 707/1 |
| 2008/0147505 | A1 | * | 6/2008 | Davis | 705/14 |

OTHER PUBLICATIONS

Lightningcast, Inc., Lightningcast Mobile Video Advertising Solution, May 2, 2005, (14 pgs.).

* cited by examiner

*Primary Examiner*—Ario Etienne
*Assistant Examiner*—Sargon N Nano

(57) ABSTRACT

One illustrative method for concatenating an unselected content stream (such as advertising) with a selected content stream to create a digital content stream includes interactions between a first server and a second server. The first server can receive a selection of the selected content stream from a hand-held device, transmit the selection to a second server, receive a playlist having location identifiers that identify at least the selected content stream and an unselected content stream, and communicate with a plurality of streaming servers collectively having streaming digital content including the selected and unselected content streams. The first server further communicates to the hand-held device a play time of the streaming digital content, concatenates the streaming digital content from the plurality of streaming servers, and provides the concatenated streaming digital content to the hand-held device as a single content stream.

21 Claims, 4 Drawing Sheets

METHODS AND SYSTEMS FOR STREAMING ADVERTISING CONTENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wide variety of devices may access the Internet and can download information, such as web pages, audio files, and video files. Generally, these devices include computers and hand-held devices, such as mobile phones and wireless email devices, and may receive a streaming digital content, such as video and/or digital files. Often, an advertisement is included with the selected digital content to generate revenue for the providers of the selected content and/or service providers. As such, it is desirable to deliver the advertisements or other unselected content seamlessly with the user selected content.

SUMMARY

One illustrative method for concatenating an unselected content stream (such as advertising) with a selected content stream to create a digital content stream can include interactions between a first server and a second server. The first server can receive a selection of the selected content stream from a hand-held device, transmit the selection to a second server, receive a playlist having location identifiers that identify at least the selected content stream and an unselected content stream, and communicate with a plurality of streaming servers collectively having streaming digital content including the selected and unselected content streams. The first server further communicates to the hand-held device a play time of the streaming digital content, concatenates the streaming digital content from the plurality of streaming servers, and provides the concatenated streaming digital content to the hand-held device as a single content stream.

An illustrative system for delivering streaming digital content to a hand-held device can include a first server communicating with the hand-held device, a second server, and a plurality of streaming servers. Moreover, generally the first server communicates a selection from the hand-held device to the second server to obtain a play list having location identifiers. Each location identifier can correspond to a selected content stream or an unselected content stream, and then the first server may communicate with the plurality of streaming servers to obtain streaming digital content. The streaming digital content can include the selected content stream and unselected content stream. The first server can pass through concatenated streaming digital content to the handheld device.

An alternative method for concatenating a streaming advertising content can include operations by a first server, a second server, and a compiling server. The first server may receive a selection of streaming selected content from a hand-held device, transmit the selection to a second server, receive from the second server a playlist having location identifiers that identify at least the selected content stream and an unselected content stream, and communicate via a compiling server with a plurality of streaming servers collectively having streaming digital content that can include streaming selected and unselected content. The compiling server downloads and caches the streaming content, and either logically or physically concatenates the streaming selected and unselected content. The first server communicates to the hand-held device a play time of the streaming digital content, provides the concatenated streaming content from the compiling server to the hand-held device.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Figure 1:
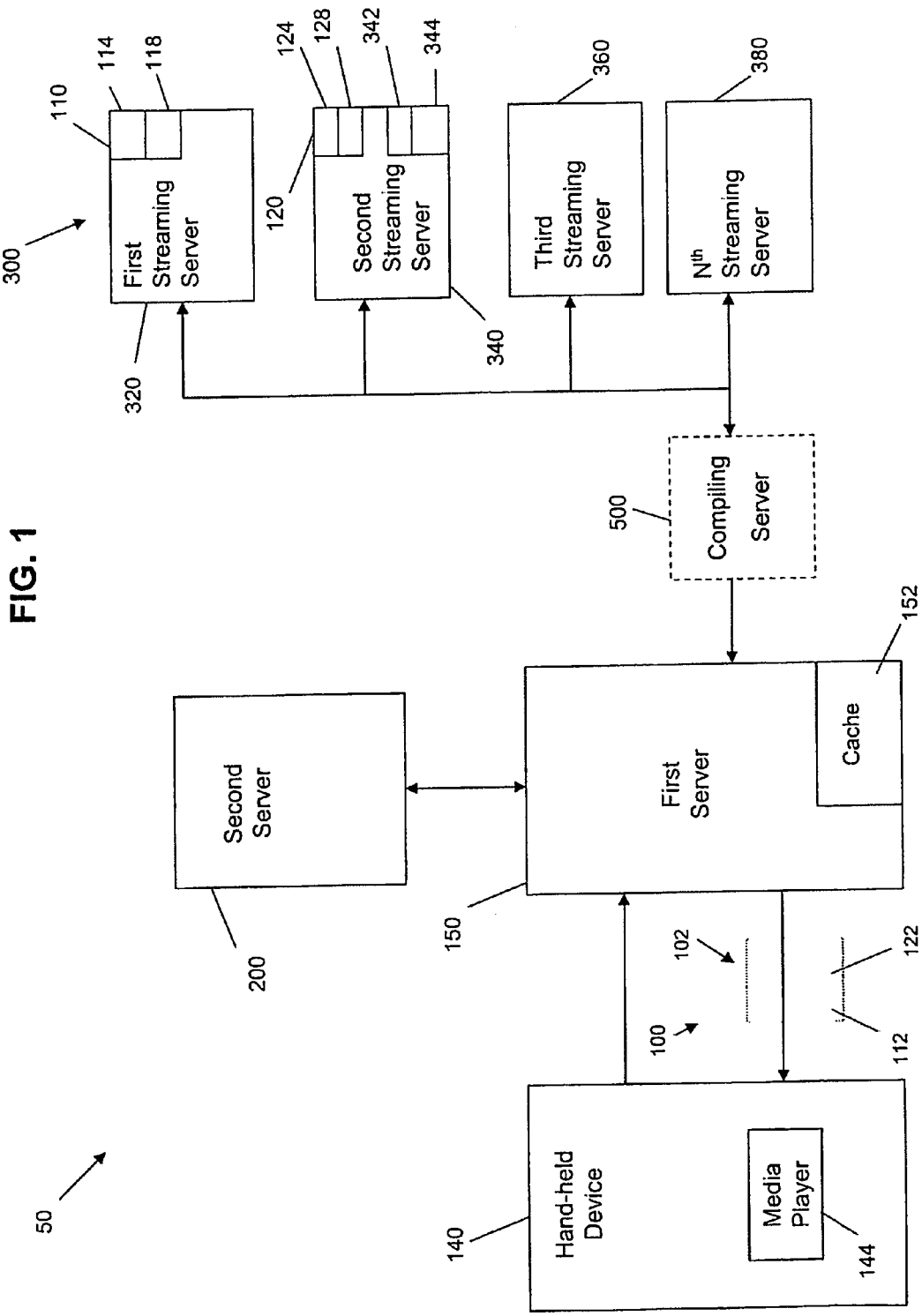
FIG. 1 depicts a schematic diagram of an illustrative embodiment of a system.

In the detailed description and claims which follow, certain terms are used to refer to particular system components. As one skilled in the art will appreciate, components may be referred to by different names. Accordingly, this document does not intend to distinguish between components that differ in name, but not function.

Also in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, wireline communicative, or wireless communicative connection. Thus, if a first device couples to a second device, that connection may be through a direct connection, or through an indirect connection via other devices and connections. Items shown or discussed as directly coupled or communicating with each other may be coupled through some interface or device, such that the items may no longer be considered directly coupled to each but may still be indirectly coupled and in communication, whether electrically, mechanically, or otherwise, with one another.

The term "streaming selected content" generally means digital content selected by a user from a website on the Internet or on some other network such as a private network. Desirably, this digital content is in the form of a video, a photograph and/or an audio file, such as news or music clips, or picture slides, although the digital content may also be in other formats. Generally, the selected content includes one or more streams, packets or clips with each stream, packet or clip selected separately or as a package by a user.

The term "streaming unselected content" generally means digital content such as advertisements, which are associated with a selected content by, e.g., an advertising server. Desirably, this digital content is in the form of a video, a photograph and/or an audio file, such as news or music clips, or picture slides, although the digital content may also be in other formats. Generally, the unselected content includes one or more streams, packets or clips.

The term "streaming digital content" generally means content including at least one streaming selected content and at least one streaming unselected content, and can include one or more digital content streams.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques described below, but may be modified within the scope of the appended claims along with their full scope of equivalents.

One illustrative embodiment of the present system and method may include a streaming content concatenation server for receiving a selection of digital Internet content from a hand-held device, transmitting the selection to a second server, and receiving a play or content list of uniform resource locators. Each uniform resource locater (hereinafter "URL") can correspond to a stream or clip of the streaming selected content and unselected content on respective streaming servers. Afterwards, the streaming content concatenation server may communicate with the streaming servers, concatenate the selected content stream and the one or more unselected content streams into a digital content stream, and seamlessly pass the digital content stream to the hand-held device.

The illustrative system and method can provide several advantages. Generally, the system and method eliminate incorporating advertisement plug-ins in a multitude of streaming servers for transmitting streaming digital content to a hand-held device, and thus, minimize the impact to content providers and their streaming infrastructures. In addition, the present system and method may reduce or eliminate the requirement and cost to store streaming advertising content on a server for sequencing and transmission to a hand-held device. Moreover, the system and method can seamlessly present the advertising content with the selected content so the user is unaware of the multiple server interaction, and thus, may increase flexibility for the service provider by allowing interaction with any advertisement server on the market and minimize impacts to the client and their devices. Furthermore, the system and method can provide easy integration and use of existing protocols/methods for integration, particularly for streaming servers not supporting for example, server-side play lists. Moreover the illustrative system and method eliminate any need to co-locate advertising and selected content on the same server, which is a configuration that does not scale well when the same advertising content needs to be employed by different streaming content servers. Moreover, the illustrative system and method avoid the need to provide client-side concatenation (i.e., client-side playlist support) on hand-held devices that have power and hardware limitations.

One illustrative system 50 may include a hand-held device 140, a first server 150, a second server 200, and a plurality of streaming servers 300. The hand-held device 140 can be a mobile phone, a wireless email device, a personal organizer, or some other form of an electronic device having wireless communications capability and relatively limited processing power. Generally, the hand-held device 140 has a media player 144, such as speakers and/or a video screen for delivering Internet content to a user. The hand-held device 140 can communicate with the first server 150 by any suitable communication, such as modem, Ethernet, ATM, DSL, wireless Transmission Control Protocol/Internet Protocol (TCP/IP), and/or telephony. One desirable protocol is an Internet Telephony Service Provider (ITSP) protocol. The hand-held device 140 can receive streaming digital content 100 using real-time streaming protocol (RTSP) and real-time transport protocol (RTP). The streaming digital content 100 can include a digital content stream 102, such as a selected content stream or clip 112 or an unselected content stream or clip 122.

The first server or streaming content concatenation server 150 may communicate with the hand-held device 140, the second server 200, and a plurality of streaming servers 300. The first server 150 can have some attributes of a proxy server because the first server 150 may serve as a gateway through which the hand-held device 140 gains access to streaming digital content 100. Also, the first server 150 can have a cache 152 and one or more routines for creating a single "describe" response 160 and for concatenating a plurality of digital streaming packets 112 and 122 from the plurality of streaming servers 300, as hereinafter described. Moreover, the first server 150 can optionally transmit client information to the second server 200. Generally, the first server 150 modifies the stream or clip header fields received from the plurality of streaming servers 300, such as clip sequence and RTP play time, to stream clips in a unitary fashion to the hand-held device 140. The first server 150 can also receive RTSP reporting packets (also known as RTCP packets) from client and servers, combine or segregate header information as necessary, remove "BYE" RTCP packets if required, and forward the resulting RTCP packets to the proper destination.

Generally, the second or advertising server 200 (also termed the "ad management server") receives a selection 130 from the first server 150 and may also receive consumer information such as a user identification, device location, and content information, such as the identification of the page that provided the link to the selected content stream 112. In response, the second server 200 can determine, based on the streaming selected content and/or the user id, what streaming unselected content 120 should be displayed. The advertising content can include one or more advertising content streams or clips 122, and the second server transmits to the first server a play or content list having a plurality of location identifiers 210, e.g., URLs. The play or content list is a file containing a list of references to both the streaming selected content 110 and the streaming unselected content 120 in the order that the content is to be displayed. Each location identifier 210 may provide the location of a clip that resides on a streaming server 300 having access to the Internet. The list specifies streaming selected content 110 chosen by a user of the hand-held device 140 and at least one unselected content stream or one or more unselected clips 122 (e.g. advertising). The second server 200 can provide, in order, the URLs that include the location on the Internet of the streaming digital content 100 stored on a plurality of streaming servers 300.

The streaming unselected content 120 can be targeted or non-targeted advertisements. To provide for targeted advertising, the first server 150 augments the message to the second server 200 with a user identification taken from the frame headers in the communications from the hand-held device 140. The second server 200 may use this user information to access databases having information, such as demographic and behavioral information, associated with the owner of the hand-held device 140. The second server 200 can select streaming unselected content 120 corresponding to the characteristics of the user. Alternatively, the streaming unselected content 120 may be chosen based on the streaming selected content 110 of the user. If non-target advertisements are provided by the second server 200, the streaming unselected content 120 can be, e.g., pre-selected and rotated on a schedule. As one example, the second server may receive a request such as "rtsp://cnn.com/HoustonWeatherClip" with a user id that enables the server to determine that the requester is a golfer. The second server may then provide a play list such as {"rtsp://adserver.com/GolfClubAd", "rtsp://cnn.com/HoustonWeatherClip", "rtsp://HoustonGolfCourseAd"}.

Generally, the plurality of streaming servers 300 includes a vast number of streaming servers, such as a first streaming server 320, a second streaming server 340, a third stream server 360, and up to an N$^{th}$ streaming server 380. The streaming servers 300 collectively can provide streaming selected content 110 and streaming unselected content 120. Each streaming server 300 can contain one or more of these streams or clips 112 or 122, such as the second streaming server 340 having streaming unselected content 120 that may include, e.g., a first advertising clip or stream 342 and a second advertising clip or stream 344. In fact, the second streaming server 340 may serve as a central storehouse for all the advertising content to be associated with a wide number of content providers. Such a configuration eliminates any need to distribute advertising content to the content providers for them to integrate into their systems.

The streaming digital content 100 can be transmitted utilizing any suitable protocol, such as RTSP and RTP. The streaming selected content 110 can include a video file 114 and an audio file 118 and the streaming unselected content 120 can include a video file 124 and an audio file 128.

Generally, the system 50 does not include a compiling server 500. Rather, the plurality of streaming servers 300 communicate with the first server 150. However, in one alternative embodiment, the system 50 may include a compiling server 500 that provides processing and storage resources for downloading and caching the content streams, and for logically or physically concatenating the content streams in accordance with play lists from the second server, thereby creating a streaming digital content stream 100 to be provided to the hand-held device. The compiling server 500 may be a streaming server and be separate or incorporated into the first server 150.

Figure 2:
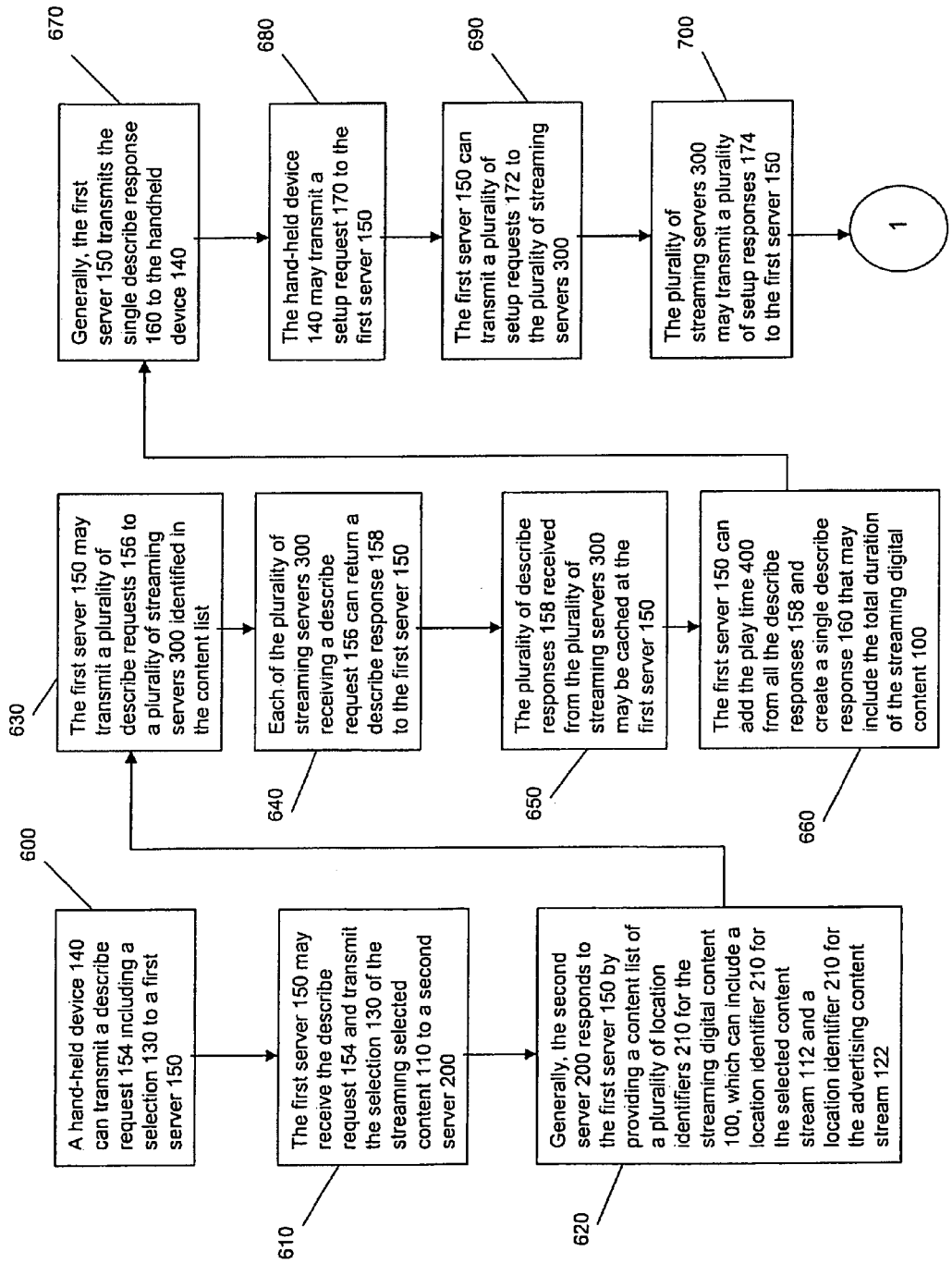
FIG. 2 depicts a block diagram of an illustrative embodiment of a part of an illustrative method for concatenating streaming advertising content.
Figure 3:
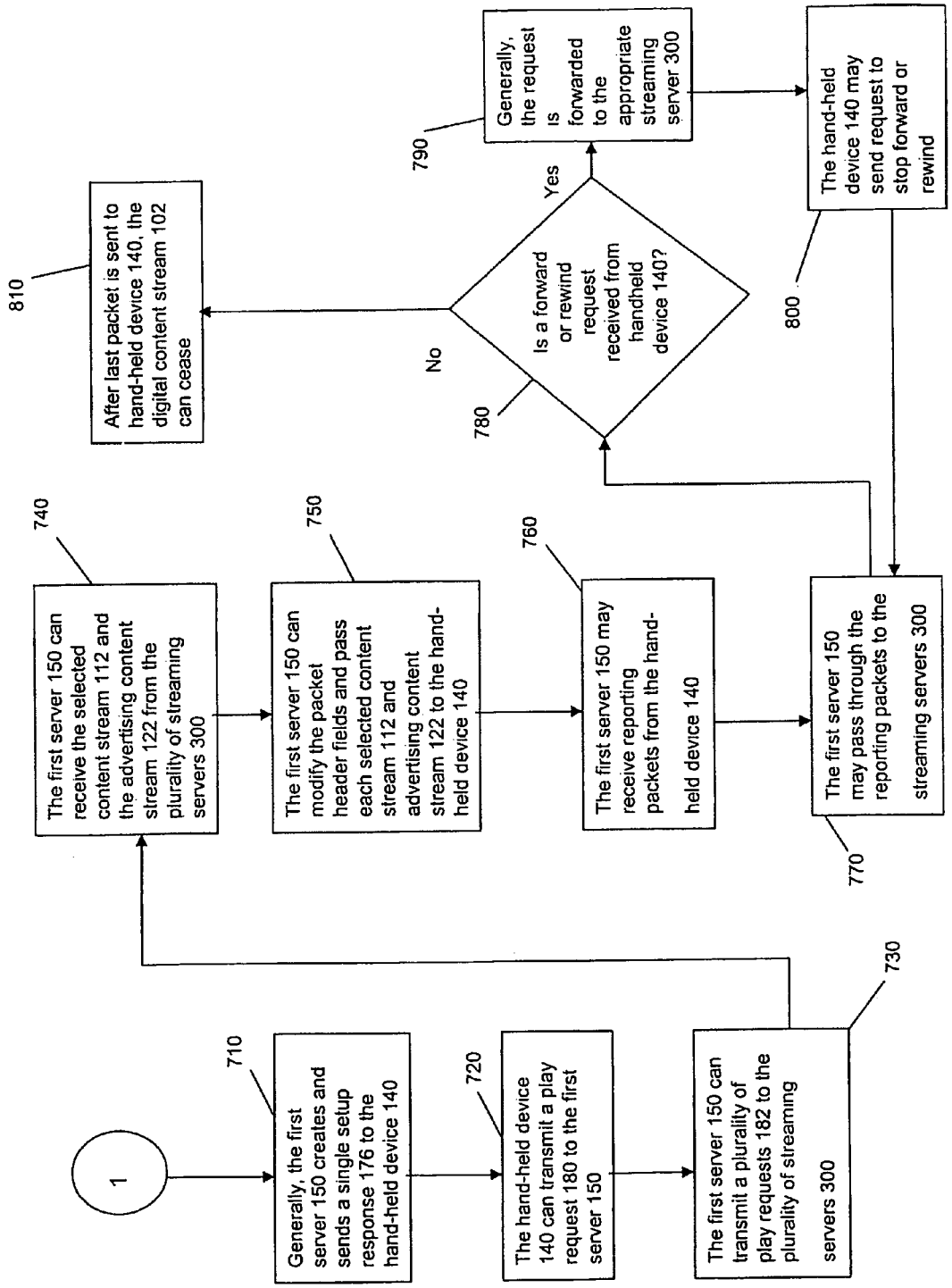
FIG. 3 depicts a block diagram of an illustrative embodiment of a part of an illustrative method for concatenating streaming advertising content.

Referring to FIGS. 1-3, an illustrative method is depicted, which can utilize RTSP/RTP protocols for streaming content and an ITSP protocol. Generally, in accordance with the RTSP protocol, a hand-held device 140 transmits a "describe" request 154 including a selection 130 to a first server 150 at a block 600. Next, the first server 150 can receive the "describe" request 154 and transmit the selection 130 of the streaming selected content 110 to a second server 200 at a block 610. That being done, generally the second server 200 responds to the first server 150 by providing a content list of a plurality of location identifiers 210 for the streaming digital content 100, which includes a location identifier 210 for the selected content stream 112 and a location identifier 210 for an advertising content stream 122 at a block 620.

Afterwards, generally the first server 150 transmits a plurality of "describe" requests 156 to a plurality of streaming servers 300 identified in the content list at a block 630, and then at a block 640, each of the plurality of streaming servers 300 receiving a "describe" request 156 returns a "describe" response 158 to the first server 150. The plurality of "describe" requests 156 can be sent simultaneously or sequentially to the plurality of streaming servers 300. Each "describe" response 158 contains information about the clip 112 or 122, such as the type of clip, e.g., audio and/or video, the play time of the clip, and, if a video, the screen resolution. At a block 650, the plurality of "describe" responses 158 received from the plurality of streaming servers 300 may be cached at the first server 150. Next, the first server 150 can add the play time 400 from all the "describe" responses 158 and create a single "describe" response 160 that includes the total duration of the streaming digital content 100 at a block 660. As such, the hand-held device 140 may receive the "describe" response 160 that simulates a single clip or packet. That being done, the first server 150 can transmit the single "describe" response 160 to the hand-held device 140 at a block 670.

An illustrative "describe" request can be as follows:
DESCRIBE rtsp://localhost:5540/the_man_pv. 3g2 RTSP/1.0
User-Agent: QuickTime/7.0.4 (qtver=7.0.4;os=Windows NT 5.1Service Pack 2)
Accept: application/sdp
Accept-Language: en-US
Bandwidth: 384000
CSeq: 1

After determining the requisite information, the first server 150 can provide an illustrative "describe" response, such as that shown below. Note that the runtime (given by the line in bold text below) is the sum of the individual runtimes for the individual clips.
RTSP/1.0 200 OK
Cache-Control: must-revalidate
Last-Modified: Fri, 20 Jan. 2006 18:36:35 GMT
Content-Base: rtsp://localhost:5540/the_man_pv.3g2/
Content-Length: 640
Cseq: 1
Server: DSS/5.5.1 (Build/489.8; Platform/Win32; Release/Darwin;)
Date: Mon, 23 Jan. 2006 22:18:58 GMT
Expires: Mon, 23 Jan. 2006 22:18:58 GMT
Content-Type: application/sdp
x-Accept-Dynamic-Rate: 1
x-Accept-Retransmit: our-retransmit
v=0
o=StreamingServer 3347043538 1137782195000 IN IP4 10.65.197.7
s=\the_man_pv.3g2
u=http:///
e=admin@
c=IN IP4 0.0.0.0
b=AS:117
t=0 0
a=control:*
a=maxprate:17.000000
a=range:npt=0-30.78333
m=video 0 RTP/AVP 96
b=AS:92
b=TIAS:88
a=maxprate:17
a=rtpmap:96 MP4V-ES/90000
a=control:trackID=3
a=cliprect:0,0,144,176 a=framesize:96 176-144
a=fmtp:96 profile-level-id=1;
config=000001B0F0000001B50EE040C0CF00000100
00000120008440FA282C20 90A31F
m=audio 0 RTP/AVP 97
b=AS:29
b=TIAS:25
a=maxprate:16
a=rtpmap:97 MP4A-LATM/16000/2
a=control:trackID=4
a=fmtp:97 profile-level-id=15;object=2;cpresent=0; config=400028203FC0

Next, "setup" requests and responses may be created and sent to negotiate which ports of the hand-held device 140 and the plurality of streaming servers 300 are to, respectively, receive and send audio and/or video tracks. Generally the hand-held device 140 transmits a "setup" request 170 to the first server 150 at a block 680 and the first server 150 transmits a plurality of "setup" requests 172 to the plurality of streaming servers 300 at a block 690. The plurality of "setup" requests 172 can be sent simultaneously or sequentially. At a block 700, the plurality of streaming servers 300 may transmit a plurality of "setup" responses 174 to the first server 150, and the first server 150 may create and send a single "setup" response 176 to the hand-held device 140 at a block 710.

Afterwards, generally the hand-held device 140 transmits a "play" request 180 to the first server 150 at a block 720 and the first server 150 transmits a plurality of "play" requests 182 to the plurality of streaming servers 300 at a block 730. The first server 150 can receive the selected content stream 112 and the unselected content stream 122 from the plurality of streaming servers 300 at a block 740 and the first server 150 can modify the packet header fields and pass each selected content stream 112 and advertising content stream 122 to the hand-held device 140 at a block 750. The content streams are sequenced within the overall content stream in the order given by the play list from the second server 200. The packet header modifications may include adjusting packet sequence numbers and RTP time to make the different streams appear as a single stream to the hand-held device 140. Next, generally the first server 150 receives reporting packets from the hand-held device 140 at the block 760, and modifies header fields as appropriate, and the first server 150 passes through the reporting packets to the streaming servers 300 at the block 770. Conversely, the reporting packets received from the streaming servers 300 are modified and passed to the hand-held device 140.

At a diamond 780, a query may be made, namely, is a forward or rewind request received from hand-held device 140? If so, the forward or rewind request may be forwarded to the appropriate streaming server 300 at a block 790 and the hand-held device 140 may send request to stop forward or rewind at a block 800. Optionally, one or both of these requests may be blocked by the first server 150. Afterwards, the method may return to the block 770. If not, after the last packet is sent to hand-held device 140, the digital content stream 102 may cease at a block 810.

The first server 150 concatenates or sequences the streaming selected content 110 and the streaming unselected content 120 in the order specified by the play list from server 200. As an example, if one advertising clip 122 is being concatenated with one selected clip 112, the advertising clip 122 can be presented before, i.e., pre-roll insertion, or after the selected clip 112, i.e., post-roll insertion, or if two advertising clips 122 are being concatenated with the selected clip 112, the selected clip 112 can be sandwiched with the advertising clips 122. Alternatively, the advertising clip 122 can be inserted into the selected clip 112, i.e., mid-roll insertion, so the selected clip 112 plays for a predetermined time, next the advertising clip 122 plays, and then the remainder of the selected clip 112 plays. Moreover, generally the entire streaming digital content 100 including the selected clip 112 and the one or more advertising clips 122 are presented seamlessly to the user via the hand-held device 140, so as to appear as a single clip.

Another illustrative method is implemented in the alternative embodiment that includes the compiling server 500. The first server 150 interfaces with the second server 200 to obtain a play list of streaming digital content 100 and forwards the play list and the "describe" request 154 to the compiling server 500. The compiling server 500 downloads the streaming selected content 110 and streaming unselected content 120 from the plurality of streaming servers 300 and logically or physically assembles a single clip 112 or 122 in the order specified by the play list. Alternatively, the compiling server 500 assembles a single clip 112 or 122 from the streaming digital content 100 cached on the compiling server 500. After assembling, the compiling server 500 can transmit the streaming digital content 100 to the first server 150 for passing or streaming to the hand-held device 140. In this embodiment, the first server 150 passes through RTSP and RTP requests/responses between the hand-held device 140 and the compiling server 500, and the compiling server handles modifying the requests/responses and combining the streaming digital content 100.

Figure 4:
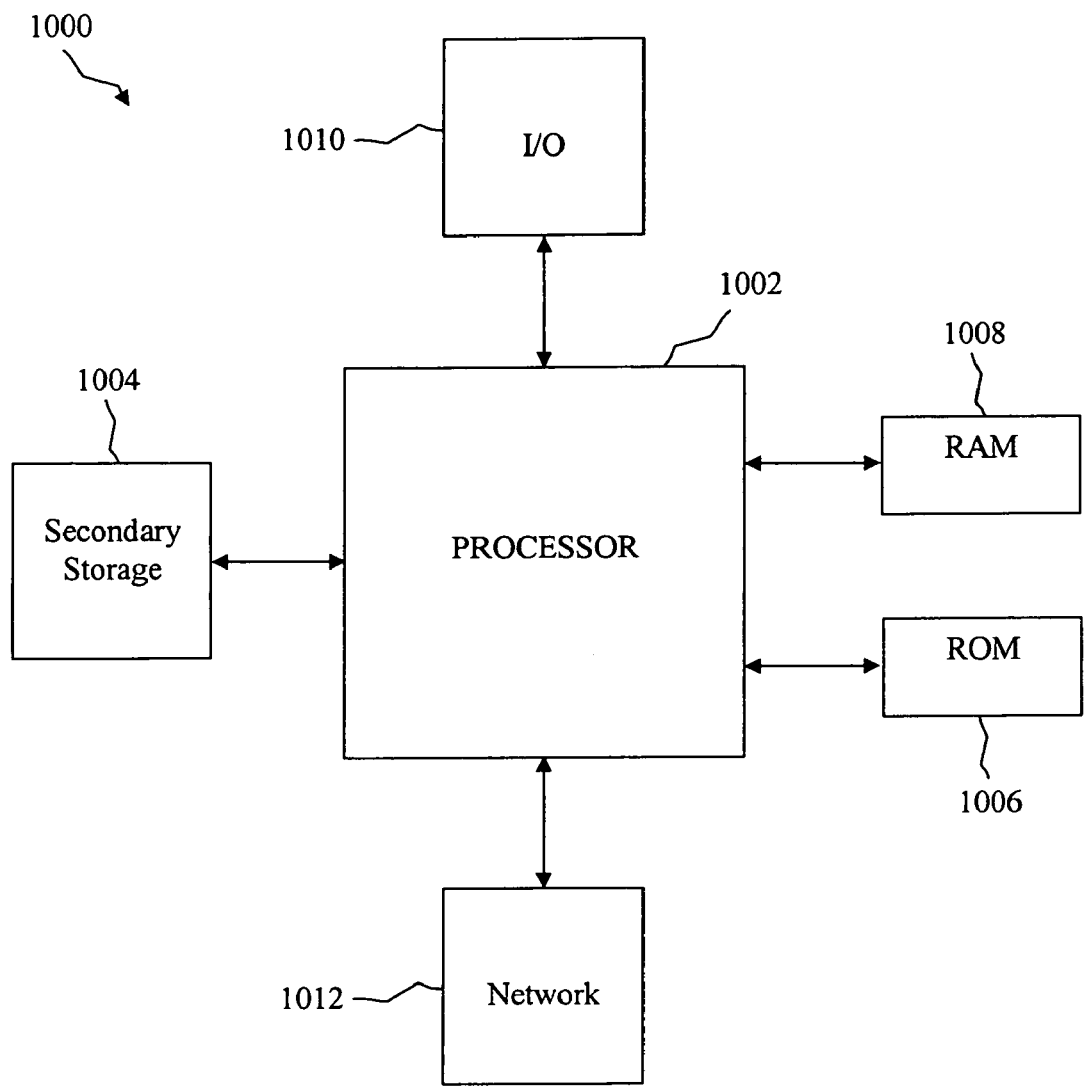
FIG. 4 illustrates an illustrative general purpose computer system suitable for implementing one or more embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 1000 includes a processor 1002 (which may be referred to as a central processor unit or CPU) that is in communication with memory devices including a secondary storage 1004, a read only memory (ROM) 1006, a random access memory (RAM) 1008, an input/output (I/O) devices 1010, and a network connectivity devices 1012. The processor may be implemented as one or more CPU chips.

The secondary storage 1004 is typically comprised of one or more disk drives or tape drives and is used for non-volatile storage of data and as an over-flow data storage device if the RAM 1008 is not large enough to hold all working data. The secondary storage 1004 may be used to store programs which are loaded into the RAM 1008 when such programs are selected for execution. The ROM 1006 is used to store instructions and perhaps data which are read during program execution. The ROM 1006 is a non-volatile memory device which typically has a small memory capacity relative to the larger memory capacity of secondary storage. The RAM 1008 is used to store volatile data and perhaps to store instructions. Access to both the ROM 1006 and RAM 1008 is typically faster than to the secondary storage 1004.

The I/O devices 1010 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1012 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices.

These network connectivity devices 1012 may enable the processor 1002 to communicate with an Internet or one or more intranets. With such a network connection, it is contemplated that the processor 1002 might receive information from the network, or might output information to the network in the course of performing the above-described method steps. Such information, which is often represented as a sequence of instructions to be executed using the processor 1002, may be received from and outputted to the network, for example, in the form of a computer data signal embodied in a carrier wave.

Such information, which may include data or instructions to be executed using the processor 1002 for example, may be received from and outputted to the network, for example, in the form of a computer data baseband signal or signal embodied in a carrier wave. The baseband signal or signal embodied in the carrier wave generated by the network connectivity devices 1012 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1002 executes instructions, codes, computer programs, scripts which it accesses from hard disk, floppy disk, optical disk (these various disk based systems may all be considered the secondary storage 1004), the ROM 1006, the RAM 1008, or the network connectivity devices 1012.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for concatenating digital content, comprising:
   receiving at a first server a selection of at least one streaming selected content from a hand-held device;
   transmitting from the first server, the selection to a second server, wherein the second server is different from the first server;
   receiving at the first server a first location identifier and a second location identifier from the second server, wherein the first location identifier corresponds to the at least one streaming selected content and the second location identifier corresponds to a streaming unselected content;
   communicating with a first streaming server and a second streaming server by the first server wherein the first streaming server comprises the streaming selected content and the second streaming server comprises the streaming unselected content;
   communicating from the first server to the hand-held device a play time of the streaming selected content and the streaming unselected content;
   concatenating the streaming selected content and the streaming unselected content; and
   transmitting from the first server the concatenated streaming digital content to the hand-held device.

2. The method of claim 1, wherein the streaming digital content comprises a plurality of streaming selected content and a plurality of streaming unselected content, wherein the plurality of streaming selected content comprises at least one of a selected video file and a selected audio file and the plurality of streaming unselected content comprises of at least one of an unselected video file and an unselected audio file.

3. The method of claim 1, further comprising receiving by the first server a describe request from the hand-held device, and communicating by the first server a plurality of describe requests to the first streaming server and the second streaming server.

4. The method of claim 3, further comprising receiving by the first server a first describe response from the first streaming server and a second describe response from the second streaming server, and concatenating by the first server the first describe response and the second describe response for transmission to the hand-held device.

5. The method of claim 4, further comprising caching the describe responses on the first server.

6. The method of claim 1, wherein the hand-held device is a mobile phone.

7. The method of claim 1, further comprising transmitting by the first server customer demographic and behavioral information to the second server.

8. The method of claim 1, wherein the first server concatenates the streaming unselected content and the streaming selected content.

9. The method of claim 1, wherein each of the first location identifier and the second location identifier comprises a uniform resource locator.

10. The method of claim 1, wherein the second streaming server comprises a plurality of advertising clips.

11. The method of claim 1, wherein a compiling server concatenates the streaming selected content and the streaming unselected content, and transmits the concatenated streaming digital content to the first server.

12. The method of claim 1, wherein the first server communicates with the first streaming server and the second streaming server via a compiling server.

13. A system for delivering streaming digital content, comprising:
   a first server configured to communicate with a hand-held device, a second server, a first streaming server comprising streaming selected content and a second streaming server comprising streaming unselected content, wherein the second server is different from the first server;

wherein the first server is further configured to communicate a selection from the hand-held device to the second server and receive from the second server a first location identifier, wherein the first location identifier corresponds to the streaming selected content and the second location identifier corresponds to the streaming unselected content, and the first server is further configured to communicate with the first streaming server to receive the streaming selected content and communicate with the second streaming server to receive the streaming unselected content, the first server further configured to transmit concatenated streaming digital content to the hand-held device.

14. The system of claim 13, wherein the first server caches a first describe response from the first streaming server and a second describe response from the second streaming server, and concatenates the first describe response and the second describe response for transmission to the hand-held device.

15. The system of claim 13, wherein the first server is further configured to concatenate the streaming selected content and the streaming unselected content.

16. The system of claim 13 further comprising a compiling server, wherein the compiling server is configured to concatenate the streaming selected content and the streaming unselected content retrieved from the first streaming server and the second streaming server, the compiling server further configured to provide the concatenated streaming digital content to the first server.

17. The system of claim 13 wherein the second server receives a user identification with the selection from the first server and wherein the second server is configured to determine based on the user identification, a targeted advertisement, wherein the targeted advertisement is transmitted as the streaming unselected content.

18. The system of claim 13, wherein the concatenated streaming digital content comprises a plurality of streaming selected content and a plurality of streaming unselected content, wherein the plurality of streaming selected content comprises at least one of a selected video file and a selected audio file and the plurality of streaming unselected content comprises at least one of an unselected video file and an unselected audio file.

19. The system of claim 13 wherein the first server is further configured to modify a first header of the streaming selected content and a second header of the streaming unselected content.

20. The system of claim 13 wherein the streaming unselected content comprises one or more of targeted advertising and non-targeted advertising.

21. The system of claim 13 wherein the streaming unselected content is inserted before or after to the streaming selected content in the concatenated streaming digital content.

* * * * *